US008811724B2

(12) United States Patent
Nielsen et al.

(10) Patent No.: US 8,811,724 B2
(45) Date of Patent: Aug. 19, 2014

(54) CLASSIFICATION OF MEDICAL DIAGNOSTIC IMAGES

(75) Inventors: Mads Nielsen, Dragør (DK); Marleen De Bruijne, Rotterdam (NL); Lauge Sørensen, Frederiksberg (DK)

(73) Assignee: The University of Copenhagen, Copenhagen (DK)

(*) Notice: Subject to any disclaimer, the term of this patent is extended or adjusted under 35 U.S.C. 154(b) by 121 days.

(21) Appl. No.: 13/103,656

(22) Filed: May 9, 2011

(65) Prior Publication Data

US 2011/0280457 A1    Nov. 17, 2011

Related U.S. Application Data

(60) Provisional application No. 61/333,513, filed on May 11, 2010.

(51) Int. Cl.
*G06K 9/00* (2006.01)
*G06K 9/62* (2006.01)

(52) U.S. Cl.
USPC ............... 382/159; 382/128; 382/228

(58) Field of Classification Search
None
See application file for complete search history.

(56) References Cited

U.S. PATENT DOCUMENTS 4,197,583 A * 4/1980 Westell et al. ............ 382/264
2005/0100208 A1* 5/2005 Suzuki et al. ............ 382/157

OTHER PUBLICATIONS

Sunil Arya and David M. Mount and Nathan S. Netanyahu and Ruth Silverman and Angela Y. Wu. An Optimal Algorithm for Approximate Nearest Neighbor Searching in Fixed Dimensions. *J. ACM*, 45(6):891-923, 1998.
Yulia Arzhaeva and Laurens Hogeweg and Pim A. de Jong and Max A. Viergever and Bram van Ginneken. Global and Local Multivalued Dissimilarity-Based Classification: application to Computer-Aided Detection of Tuberculosis. *MICCAI* (1), pp. 724-731, 2009.
A. A. Bankier and V. De Maertelaer and C. Keyzer and P. A. Gevenois. Pulmonary emphysema: subjective visual grading versus objective quantification with macroscopic morphometry and thin-section CT densitometry. *Radiology*, 211(3):851-858, 1999.
J. M. Bland and D. G. Altman. Statistical methods for assessing agreement between two methods of clinical measurement. *Lancet*, 1(8476):307-310, 1986.
Francois Chabat and Guang-Zhong Yang and David M Hansell. Obstructive lung diseases: texture classification for differentiation at CT. *Radiology*, 228(3):871-877, 2003.

(Continued)

*Primary Examiner* — Thomas Conway
(74) *Attorney, Agent, or Firm* — Benjamin Aaron Adler

(57) ABSTRACT

The invention provides methods for automated classification of a medical diagnostic image of a lung according to its deduced probability of relating to a lung of a patient who is suffering from a diffuse parenchymal lung disease such as chronic obstructive pulmonary disease (COPD), cystic fibrosis, or severe asthma, or to a class of patients characterized by the severity of such a condition, or to a class of patients characterized by a prognostic likelihood of developing such a condition or severity of condition.

16 Claims, 2 Drawing Sheets

(56) References Cited

OTHER PUBLICATIONS

Cover, T. and Hart, P. Nearest neighbor pattern classification. *IEEE_J_IT*, 13(1):21-27, 1967.

A. Dirksen and N. H. Holstein-Rathlou and F. Madsen and L. T. Skovgaard and C. S. Ulrik and T. Heckscher and A. Kok-Jensen. Long-range correlations of serial FEV1 measurements in emphysematous patients and normal subjects. *J Appl Physiol*, 85(1):259-265, 1998.

Ola Friman and Magnus Borga and Mikael Lundberg and Ulf Tylén and Hans Knutsson. Recognizing Emphysema—A Neural Network Approach. *ICPR '02: Proceedings of the 16th International Conference on Pattern Recognition (ICPR'02)* vol. 1, pp. 10512, Washington, DC, USA, 2002. IEEE Computer Society.

G. A. Gould and W. MacNee and A. McLean and P. M. Warren and A. Redpath and J. J. Best and D. Lamb and D. C. Flenley. CT measurements of lung density in life can quantitate distal airspace enlargement—an essential defining feature of human emphysema. *Am Rev Respir Dis*, 137(2):380-392, 1988.

Jain, A.K. and Duin, R.P.W. and Jianchang Mao. Statistical pattern recognition: a review. *IEEE_J_PAMI*, 22(1):4-37, 2000.

H. Knutsson and C.-F. Westin. Normalized and Differential Convolution: Methods for Interpolation and Filtering of Incomplete and Uncertain data. *Proceedings of Computer Vision and Pattern Recognition ('93)*, pp. 515-523, New York City, USA, 1993.

Levina, E. and Bickel, P. The Earth Mover's distance is the Mallows distance: some insights from statistics. *Proc. Eighth IEEE International Conference on Computer Vision ICCV 2001*, pp. 251-256, 2001.

Pechin Lo and Jon Sporring and Haseem Ashraf and Jesper J.H. Pedersen and Marleen de Bruijne. Vessel-guided Airway Tree Segmentation: A Voxel Classification Approach. *Med. Image Anal.*, In Press, Accepted Manuscript:-, 2010.

Loog, Marco and Van Ginneken, B. Static posterior probability fusion for signal detection: applications in the detection of interstitial diseases in chest radiographs. *ICPR* (1), pp. 644-647, 2004.

K. Murphy and B. van Ginneken and E.M van Rikxoort and B.J. de Hoop and M. Prokop and P. Lo and M. de Bruijne and J.P.W. Pluim. Obstructive pulmonary function: patient classification using 3D registration of inspiration and expiration CT images. *The Second International Workshop on Pulmonary Image Analysis*, 2009.

N. L. Müller and C. A. Staples and R. R. Miller and R. T. Abboud. "Density mask". An objective method to quantitate emphysema using computed tomography. *Chest*, 94(4):782-787, 1988.

Timo Ojala and Matti Pietikäinen and David Harwood. A comparative study of texture measures with classification based on featured distributions. *Pattern Recognition*, 29(1):51-59, 1996.

Yang Shin Park and Joon Beom Seo and Namkug Kim and Eun Jin Chae and Yeon Mok Oh and Sang Do Lee and Youngjoo Lee and Suk-Ho Kang. Texture-based quantification of pulmonary emphysema on high-resolution computed tomography: comparison with density-based quantification and correlation with pulmonary function test. *Investigative Radiology*, 43(6):395-402, 2008.

Jesper H Pedersen and Haseem Ashraf and Asger Dirksen and Karen Bach and Hanne Hansen and Phillip Toennesen and Hanne Thorsen and John Brodersen and Birgit Guldhammer Skov and Martin Døssing and Jann Mortensen and Klaus Richter and Paul Clementsen and Niels Seersholm. The Danish randomized lung cancer CT screening trial—overall design and results of the prevalence round. *J Thorac Oncol*, 4(5):608-614, 2009.

Mithun Prasad and Arcot Sowmya and Peter Wilson. Multi-level classification of emphysema in HRCT lung images. *Pattern Anal. Appl.*, 12(1):9-20, 2009.

Klaus F. Rabe and Suzanne Hurd and Antonio Anzueto and Peter J. Barnes and Sonia A. Buist and Peter Calverley and Yoshinosuke Fukuchi and Christine Jenkins and Roberto Rodriguez-Roisin and Chris van Weel and Jan Zielinski. Global strategy for the diagnosis, management, and prevention of chronic obstructive pulmonary disease: GOLD executive summary. *Am J Respir Crit Care Med*, 176(6):532-555, 2007.

Raundahl, J. and Loog, M. And Pettersen, P. And Tanko, L. B. And Nielsen, M. Automated Effect-Specific Mammographic Pattern Measures. *IEEE_J_MI*, 27(8):1054-1060, 2008.

Yossi Rubner and Carlo Tomasi and Leonidas J. Guibas. The Earth Mover's Distance as a Metric for Image Retrieval. *Int. J. Comput. Vision*, 40(2):99-121, 2000.

Ingrid C Sluimer and Paul F van Waes and Max A Viergever and Bram van Ginneken. Computer-aided diagnosis in high resolution CT of the lungs. *Med. Phys.*, 30(12):3081-3090, 2003.

Sørensen, L. and Shaker, S. B. and de Bruijne, M. Quantitative Analysis of Pulmonary Emphysema Using Local Binary Patterns. *IEEE_J_MI*, 29(2):559-569, 2010.

Lauge Sørensen and Pechin Lo and Haseem Ashraf and Jon Sporring and Mads Nielsen and Marleen de Bruijne. Learning COPD Sensitive Filters in Pulmonary CT. *MICCAI* (1), pp. 699-706, 2009.

R. Uppaluri and E. A. Hoffman and M. Sonka and P. G. Hartley and G. W. Hunninghake and G. McLennan. Computer recognition of regional lung disease patterns. *Am. J. Respir. Crit. Care Med.*, 160(2):648-654, 1999.

Ye Xu and Milan Sonka and Geoffrey McLennan and Junfeng Guo and Eric A Hoffman. MDCT-based 3-D texture classification of emphysema and early smoking related lung pathologies. *IEEE_J_MI*, 25(4):464-475, 2006.

Turner, M.R. Texture Discrimination by Gabor Functions. *Biological Cybernetics*, 55:71-82, 1986.

T. Leung and J. Malik. Representing and recognizing the visual appearance of materials using three-dimensional textons. *International Journal of Computer Vision*, 43(1):29-44, 2001.

Haralick, R. M. Statistical and structural approaches to texture. *Proceedings of the IEEE*, 67(5): 786-804, 1979.

Ojala, T. and Pietikainen, M. and Maenpaa, T. Multiresolution Gray-Scale and Rotation Invariant Texture Classification with Local Binary Patterns. *IEEE Trans Pattern Anal Mach Intell*, 24(7):971-987, 2002.

Leo Breiman. Random forests. *Machine Learning*, 45(1):5-32, 2001.

E. Pekalska and R. P. W. Duin. Dissimilarity representations allow for building good classifiers. *Pattern Recog. Lett.*, 23(8):943-956, 2002.

P. Quanjer, G. Tammeling, J. Cotes, O. Pedersen, R. Peslin, and J. Yernault, "Lung volumes and forced ventilatory flows. Report working party standardization of lung function tests, European Community for Steel and Coal. Official statement of the European Respiratory Society," Eur Respir J Suppl, vol. 16, pp. 5-40, 1993.

Van Ginneken, B.; Katsuragawa, S.; ter Haar Romeny, B.; Doi, K., and Viergever, M. Automatic detection of abnormalities in chest radiographs using local texture analysis IEEE Transactions on Medical Imaging, 2002, 21, 139-149.

Sluimer, I. C.; Prokop, M.; Hartmann, I., and van Ginneken, B. Automated classification of hyperlucency, fibrosis, ground glass, solid, and focal lesions in high-resolution CT of the lung. Medical Physics, 2006, 33, 2610-2620.

Arzhaeva, Y.; Tax, D., and van Ginneken, B. Dissimilarity-based classification in the absence of local ground truth: Application to the diagnostic interpretation of chest radiographs Pattern Recognition, 2009, 42, 1768-1776.

E.R. DeLong and D.M. DeLong and D.L. Clarke-Pearson. Comparing the areas under two or more correlated receiver operating characteristic curves: a nonparametric approach. Biometrics, 44(3): 837-845, 1988.

\* cited by examiner

CLASSIFICATION OF MEDICAL DIAGNOSTIC IMAGES

CROSS REFERENCE TO RELATED APPLICATION

This application claims priority to U.S. application Ser. No. 61/333,513, filed May 11, 2010. The entire contents of the aforementioned patent application is hereby incorporated herein by this reference.

BACKGROUND OF THE INVENTION

Current quantitative measures of chronic obstructive pulmonary disease (COPD) are limited in several ways. Pulmonary function tests (PFTs) are the gold standard for assessment and diagnosis of COPD [23]. These are cheap and fast to acquire but are limited by insensitivity to early stages of COPD and lack of reproducibility [8]. Visual and computerized assessment in computed tomography (CT) imaging has emerged as an alternative that directly can measure the two components of COPD, namely, small airway disease and emphysema. However, it is difficult to assess disease severity and progression visually. Moreover, visual assessment is subjective, time-consuming, and suffers from intra-observer and inter-observer variability [3, 18]. The most widely used computerized measures, also referred to as densitometry or quantitative CT, are relative area of emphysema (RA) [18] and percentile density (PD) [11]. These measures consider each parenchyma voxel in the CT image independently thereby disregarding potentially valuable information, such as spatial relations between voxels of similar or differing intensities and patterns at larger scales, and they are restricted to a single threshold parameter, which makes them sensitive to noise in the CT images.

COPD is estimated to become the fifth most burdening disease and the third leading cause of death worldwide by 2020[23], and the limitations of current quantitative measures may hinder progression in research on treatments for the disease. Further, more and more medical data is being produced, both in routine clinical practice, and in screening and epidemiological studies, increasing the demand for robust and sensitive automatic methods for quantification.

Supervised texture classification in CT where a classifier is trained on manually annotated regions of interest (ROIs) [5, 20, 22, 27, 28, 30, 32] uses much more of the information available in the CT images compared to the densitometric measures, and the output of a trained classifier can be used for COPD quantification by fusion of individual voxel posterior probabilities [16, 20, 28]. However, this approach requires labeled data, which is usually acquired by manual annotation done by human experts. Manual annotation suffers from the same limitations as visual assessment of emphysema in CT images [3, 18], moreover, it is hard to demarcate or position ROIs in CT images, since the appearance of the disease patterns is subtle and diffuse, especially at early stages of COPD. Further, analysis is limited to current knowledge and experience of the experts, and there can be a bias towards typical cases in the annotated data set.

SUMMARY OF THE INVENTION

The present invention provides the automated classification of a medical diagnostic image of a lung according to its deduced probability of relating to a lung of a patient who is suffering from a diffuse parenchymal lung disease such as chronic obstructive pulmonary disease (COPD), cystic fibrosis, or severe asthma, or to a class of patients characterised by the severity of such a condition, or to a class of patients characterised by a prognostic likelihood of developing such a condition or severity of condition.

The invention includes a fully automatic, data-driven approach for texture-based quantitative analysis of chronic obstructive pulmonary disease (COPD) in pulmonary computed tomography (CT) images. Whilst the invention is not limited to this, it will be described herein for illustrative purposes in detail in such a context. The approach described in detail herein uses supervised learning, without however requiring manually annotated data. Instead, pulmonary function testing (PFT) data or other metadata is used to acquire the data labels.

BRIEF DESCRIPTION OF THE DRAWINGS

The invention will be further described and illustrated by the following example of its use in combination with the accompanying drawings, in which.

DETAILED DESCRIPTION OF THE INVENTION

Figure 1:
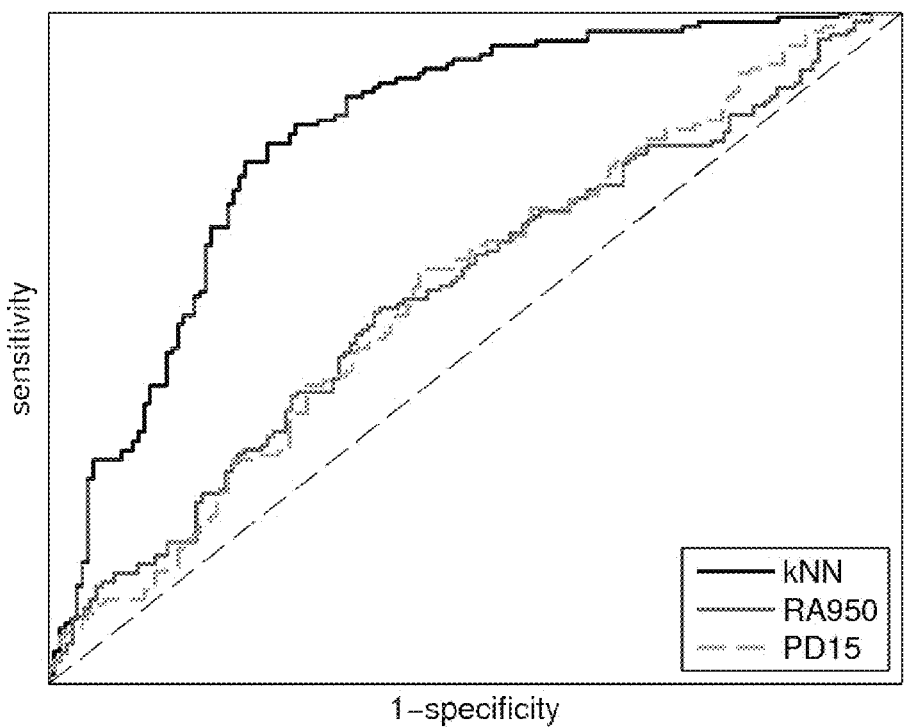
FIG. 1 shows ROC curves from a COPD diagnosis procedure described below. The curve for kNN is based on (12)

The present invention provides a method for the computerised classification of a medical diagnostic image of a lung or of a part of a lung, comprising applying to said image a trained statistical classifier which has been trained by supervised learning on a training set of methodologically similar lung images each of which images has been labelled by metadata indicative of the likelihood of the respective image relating to a lung characterised by a lung disease, or the degree of such disease, or propensity to develop such disease, wherein in said training of the classifier, for each image in the training set a number of regions of interest (ROIs) were defined, and textural information relating to the intensities of locations within each ROI was obtained, and combinations of features of said textural information were found which suitably classify said training set images according to said metadata, and wherein, in applying said trained statistical classifier to said image, in a computer a number of regions of interest (ROIs) are defined, and textural information relating to the intensities of locations within each ROI of the kind used in training the classifier is obtained, and features of said textural information for the locations within the ROIs of the image are combined as learnt in the training of the classifier to calculate probabilities of said locations within the ROIs belonging to a healthy lung as against a lung characterised by a said disease or degree of disease or propensity to develop disease and said probabilities are combined to obtain for the image a quantitative fused probability of the image belonging to a healthy lung as against a lung characterised by said disease, or a degree thereof, or a propensity to develop said disease.

The quantitative fused probability may also be regarded as a continuous measurement of disease severity shown by the image being classified, where a probability of 0 indicates completely healthy and a probability of 1 indicates that all of the ROIs considered show pathology.

The term 'metadata' is used herein to refer to data which is not obtained from the image or images under consideration and includes in particular diagnostic findings separate from said images, such as spirometry measurements on the relevant patient in the case of COPD. It includes also data which is predictive of such diagnostic findings in some degree, including demographic information or medical history information. It includes also knowledge of the responsiveness of the illness of a patient from whom an image originates to one or more different treatment regimes.

The term 'methodologically similar' implies that the images used in training the classifier and the image of interest that is to be classified should be of the same technical kind in order that they may meaningfully be compared. So a CT scan should be classified by the use of a model trained on CT scans, an MRI should be classified by the use of a model trained on MRIs and so forth. Preferably, the conditions under which the images used in training and the image of interest were obtained should all be as close as practical. Thus, in the case of CT scans, they should ideally be obtained using the same general kind or even the same model of scanner set up in the same way. However, some deviation from the exact same conditions will generally be acceptable, possibly with some degradation of the results. That may be compensatable by using more training examples.

COPD is conventionally diagnosed by means of spirometry (pulmonary function testing). During pulmonary function tests, subjects are instructed to exhale fully into a mouthpiece and various measurements are made, including 'Forced Expiratory Volume in 1 Second' (FEV1) and 'Forced Vital Capacity' (FVC). FEV1 measures how much air volume is released in the first second of expiration, and FVC determines the entire volume exhaled. A value known as 'FEV1-Predicted' is determined using look up tables based on details such as the subject's gender, height, weight, age and race. The Table below illustrates how COPD is diagnosed based on these measurements. FEV1 as a percentage of FVC determines the presence or absence of COPD, while FEV1 as a percentage of FEV1-Predicted is used to establish the severity of the condition.

TABLE

The criteria for determination of COPD class by pulmonary function testing

| | COPD Class: | | | | |
|---|---|---|---|---|---|
| | 0 (No COPD) | 1 (Mild) | 2 (Moderate) | 3 (Severe) | 4 (V. Severe) |
| Measurement: | | | | | |
| FEV1 as % of FVC | ≥70 | <70 | <70 | <70 | <70 |
| FEV1 as % of FEV1 Predicted | | ≥80 | ≥50, <80 | ≥30, <50 | <30 |

Such measurements may be used as metadata in the methods of the invention.

Suitable medical diagnostic images to which the invention may be applied include computed tomography (CT) images, radiograph images or MRI images. All of these are routinely employed in the investigation of diffuse parenchymal lung diseases. The use of ultrasound images or other imaging technologies is not preferred.

The method of the invention is particularly effective when applied to images in which the disease is not focal but affects substantial areas within the lung, even if the effects are not distinguishable in the image by eye or are only with difficulty distinguished by eye. Preferably therefore the disease in question is one that in developed cases will affect at least 10% of the lung volume, preferably at least 30%. Diseases that may be investigated include chronic obstructive pulmonary disease (COPD) as well as other diffuse lung diseases such as cystic fibrosis or severe asthma. Parenchymal diseases and also small airways diseases may suitably be investigated. Diffuse parenchymal lung disease (DPLD) represents a large and heterogeneous group of disorders which may be investigated according to the invention. These include granulomatous disorders, idiopathic pulmonary fibrosis and other entities of idiopathic interstitial pneumonia, the collagen vascular diseases, drug-induced infiltrative lung disease as well as orphan diffuse lung diseases including Langerhans' cell histiocytosis, lymphangioleiomyomatosis and pulmonary alveolar proteinosis.

Optionally, each said image is a 3D image and said locations within ROI's are voxels. However, the described methods may be applied also where each said image is a 3D image and said locations within ROI's are pixels within a 2D slice of said image. Alternatively, as in the case of a radiograph, the images may be 2D images.

Preferably, the image is segmented by an automated computerised procedure to identify those locations (whether pixels or voxels) that relate to relevant structures, so as to exclude areas external to the lungs, the trachea, the main bronchi, the vessels, the fissures and the airway walls.

Whilst the method may typically be applied to the whole of the segmented image, it is also possible to apply the method to selected parts thereof, for instance to select just one lobe of the lung to be used in training and in the diagnostic evaluation. Alternatively, all lobes may be used but treated as separate images. By such methods it is possible to reach a diagnostic outcome that not only identifies the lung as being subject to present or future disease but which also specifies a location, e.g. one lobe, as being the site of the disease.

In training said classifier and in applying said classifier to said image to be classified said features of textural information may suitably be obtained by applying a bank of Gaussian filters and obtaining histograms of responses to said filters. Although other texture features may be used, e.g., Gabor filters, co-occurrence matrices, run-length matrices, local binary patterns, or textons [33, 34, 35, 36]. Optionally, said filters are rotational invariant filters.

Preferably, said filters comprise one or more of the following:
(a) the Gaussian function $$G(x;\sigma) = \frac{1}{(2\pi^{1/2}\sigma)^3} \exp\left(-\frac{\|x\|_2^2}{2\sigma^2}\right) \quad (1)$$

where $\sigma$ is the standard deviation, or scale;
(b), (c), (d) the three eigenvalues of the Hessian matrix $$\lambda_{i,\sigma}, i=1,2,3, |\lambda_{1,\sigma}| \geq |\lambda_{2,\sigma}| \geq |\lambda_{3,\sigma}| \quad (2)$$

(e) gradient magnitude $$\|\nabla G(x;\sigma)\|_2 = \sqrt{I_{x,\sigma}^2 + I_{y,\sigma}^2 + I_{z,\sigma}^2}, \quad (3)$$

where $I_{x,\sigma}$ denotes the partial first order derivative of image I w.r.t. x at scale σ;

(f) Laplacian of the Gaussian $$\nabla^2 G(x;\sigma) = \lambda_{1,\sigma} + \lambda_{2,\sigma} + \lambda_{3,\sigma}; \quad (4)$$

(g) Gaussian curvature $$K(x;\sigma) = \lambda_{1,\sigma} \lambda_{2,\sigma} \lambda_{3,\sigma}; \quad (5)$$

and (h) the Frobenius norm of the Hessian $$\|H(x;\sigma)\|_F = \sqrt{\lambda_{1,\sigma}^2 + \lambda_{2,\sigma}^2 + \lambda_{3,\sigma}^2}. \quad (6)$$

Non-rotational invariant filters may be used but may require a larger amount of training data and/or a greater number of filters.

Whilst it is possible for the ROI's collectively to encompass the whole of the relevant parts of the image (i.e. the parts showing parenchymal tissue as opposed to areas external to the lungs, the trachea, the main bronchi, the vessels, the fissures and the airway walls), it is generally advantageous to sample the relevant parts of the image so that in training said classifier and in applying said classifier to said image to be classified said ROIs are scattered within the image, but preferably only within the relevant parts thereof. Preferably the ROIs together comprise at least 20%, more preferably at least 30% of the image but optionally may be less than or equal to 60%, more preferably 40% of the total image.

Preferably, the said ROI's are randomly sampled within the image. The randomization of the sampling may be conducted for each image, or the same sampling may be applied to all the images used having once been randomly obtained.

The trained classifier is preferably a kNN classifier. Although any supervised classifier, taking as input feature vectors representing the ROIs or dissimilarities computed directly between the ROIs, can be used for classification of the ROIs. Examples of classifiers that can be used are: template matching; nearest mean classifier; parzen classifier; logistic classifier; support vector classifier; linear, quadratic, non-linear discriminant; neural networks; Gaussian process classifier; decision trees, e.g., C4.5; ensemble methods, e.g., AdaBoost and random forests; and dissimilarity representation-based classifiers [9, 12, 37, 38, 39].

Classifiers with probabilistic output, such as the kNN classifier used in the example, as well as classifiers with a hard classification output can be directly plugged in. In the case of a hard classification output, the output is interpreted as a 0/1 probability, and the subsequent fusion of ROI classifications ensures a continuous output.

Dissimilarity-based classifiers, such as the kNN classifier, template matching and dissimilarity representation-based classifiers, can work directly on the ROI dissimilarities. Feature vector space classifiers can be applied, e.g., by interpreting each bin in the concatenated filter response histograms as a feature or by using moments of the histograms as features.

In a second aspect, the invention includes a method for the development of a statistical classifier for computerised classification of a medical diagnostic image of a lung or a part thereof, comprising in a suitably programmed computer taking a training set of methodologically similar lung images each of which images has been labelled by metadata indicative of the likelihood of the respective image relating to a lung characterised by a lung disease, or the degree of such disease, or propensity to develop such disease, and training the classifier by, for each image in the training set defining a number of regions of interest (ROIs), and obtaining textural information relating to the intensities of locations within each ROI, and finding combinations of features of said textural information which suitably classify said training set images according to said metadata. All of the features described in relation to the first aspect of the invention may be used in relation to this second aspect also.

The methods of the invention are to be performed in a suitably programmed computer and the invention includes an instruction set for causing a computer to execute a method of the invention on a digital representation of an image or set of images as described. The invention also includes a computer programmed with such an instruction set.

Exemplification

In the example of the invention described below posterior probability of the entire lung fields belonging to a certain class is proposed herein as quantitative measure of COPD, and it is obtained by fusing probabilities computed in local regions of interest (ROIs) within the lung fields. The individual ROI probabilities are computed using a k nearest neighbor (kNN) classifier that is trained on a set of randomly sampled ROIs from the training CT images where the sampled ROIs are labeled using PFT data from the associated subjects. The distance between two ROIs in the kNN classifier is computed as the textural dissimilarity between the ROIs, where the ROI texture is described by histograms of filter responses from a multi-scale, rotation invariant Gaussian filter bank.

The proposed measure is evaluated and compared to the two most common computerized quantitative measures of COPD in the literature, namely, relative area of emphysema (RA) and percentile density (PD), and is shown to be significantly better at discriminating between healthy and COPD subjects. A reproducibility experiment also shows that the proposed measure is less influenced by inspiration level compared to RA and PD.

As exemplified below, a fully automatic, data-driven approach for texture-based quantitative analysis of COPD in pulmonary CT images and related tasks is described. The main idea is to utilize meta-data that is connected with the relevant images to acquire the labels. Hereby, no human intervention is required. Not only are all the above mentioned limitations handled, but training a classifier that 'mimics the human expert' is avoided. Instead, a fully data-driven, and thereby objective, image based measure is obtained that can both easily be applied to analyze large data sets and that may reveal new insights into the mechanisms of COPD or other conditions.

The proposed approach still relies on supervised texture classification and fusion of individual voxel posterior probabilities [16, 20, 28], but with ROIs and labels preferably acquired in the following way: the CT images are assigned a global label according to PFTs from the associated subjects, and ROIs are sampled at random from within the lung fields and labeled with the global label of the CT image they are sampled from. In principle, other meta-data associated with the subject from which the CT image is acquired, such as demographics, or smoking history, could be considered when labeling. The focus of this example is on utilizing PFTs, which are the current gold standard for diagnosis of COPD [23], for acquiring labels. Supervised learning on data labeled by meta-data should not be confused with unsupervised learning [12]. One might end up with arbitrary clusterings in an unsupervised approach, e.g. a cluster of corresponding CT noise artifacts [31] and a cluster where the healthy and the pathological tissue are lumped together, which is not useful for COPD quantification. Instead, use of the weakly labeled data in a supervised learning approach to steer the solution towards two main clusters, one corresponding to healthy and one corresponding to pathology is proposed. These two clusters are expected to overlap, since the lung in a COPD patient also contains healthy tissue, and the clusters may be bi-modal, especially the pathology cluster due to different subtypes of emphysema [31] and different stages of disease progression.

Recently, Murphy et al. presented a quantitative study of COPD based on pairs of full inspiration and full expiration CT images, using RA in the individual images and voxel differences between the two aligned images as features, where the labels were obtained from PFTs [17]. This is similar in spirit to the work presented in this study, i.e. the aim is COPD quantification where the labels are obtained from PFTs. However, there are several major differences between this and the current study and [17]. First of all, quantification based on a single full inspiration CT image is performed; secondly, a texture-based approach is used; and thirdly, individual voxel classifications are fused to obtain the overall quantitative CT image measure. Other studies using labels acquired using meta-data, but with different features and different classification setup, have been published in other areas of medical imaging as well, including assessment of structural changes of the breast tissue in digital mammography [24] and detection of tuberculosis in chest radiographs [2].

The proposed measure is evaluated on a two-class classification problem defined using PFTs: diagnosis of COPD using a classifier trained on healthy subjects and subjects with COPD, and compare to the common densitometric measures RA and PD. The stability and reproducibility of the approach, as well as robustness to inspiration level—a major source of variability in CT images, is further evaluated. A preliminary version of the work described here appeared in [29].

The approach for COPD quantification relies on texture-based classification of ROIs, or strictly speaking, classification of voxels using texture information in a local neighborhood. The ROI, or voxel, classification is done with a k nearest neighbor (kNN) classifier using dissimilarity between sets of filter response histograms directly as distance, and the histograms are based on the filter responses from a rotation invariant, multi-scale Gaussian filter bank [25]. A quantitative measure of a CT image is obtained by fusing the individual voxel posteriors into one posterior [16]. This approach has previously been successfully applied on another CT data set using manually labeled ROIs for training [28].

A segmentation of the lung fields is needed in order to steer the sampling of ROIs as well as to decide which voxels that contribute to the filter response histograms, and the next section describes how this segmentation is obtained.

Segmentation of the Lung Fields

The lung fields are segmented in CT image I using a region growing algorithm, which assumes that lung parenchyma is below −400 Hounsfield units (HU). The algorithm automatically detects part of the trachea by searching for a dark cylindrical structure in the top of the image, and the detected trachea is subsequently used to segment the left and right main bronchi. The segmented left and right main bronchi are then used to initiate two region growing procedures that segment the left and right lung field. The final segmented lung fields, s(I), are obtained after a post processing step, where erroneously included regions belonging to the esophagus are removed by looking for tube-like structures between the segmented left and right lung fields. This is the same lung segmentation algorithm as is used in [15]. s(I) excludes the trachea, the main bronchi, the vessels, the fissures, and the airway walls. Note, however, that the interior of the airways is retained.

Texture Descriptors

The textural information in a CT image is captured in this example by measuring various texture features in randomly sampled ROIs from that image, although the procedure described below could be applied to all locations in the image (each being treated as an ROI) at the expense of increased computation. It is a surprising finding below that this would be unnecessary. A filtering approach is used for this purpose where a filter bank comprising a total of eight rotational invariant filters based on the Gaussian function and combinations of derivatives of the Gaussian is applied at multiple scales, giving rise to a large number of filtered versions of the CT image. The ROIs in the image are represented by histograms of the filter responses, one for each of the applied filters, and classification is done based on this representation. In the following, a more detailed explanation of how the filter response histograms are obtained is given.

Filters

Eight different measures of local image structure are used as base filters: The Gaussian function $$G(x;\sigma) = \frac{1}{(2\pi^{1/2}\sigma)^3} \exp\left(-\frac{\|x\|_2^2}{2\sigma^2}\right) \qquad (1)$$

where $\sigma$ is the standard deviation, or scale; the three eigenvalues of the Hessian matrix $$\lambda_{i,\sigma}, i=1,2,3, |\lambda_{1,\sigma}| \geq |\lambda_{2,\sigma}| \geq |\lambda_{3,\sigma}| \qquad (2)$$

gradient magnitude $$\|\nabla G(x;\sigma)\|_2 = \sqrt{I_{x,\sigma}^2 + I_{y,\sigma}^2 + I_{z,\sigma}^2}, \qquad (3)$$

where $I_{x,\sigma}$ denotes the partial first order derivative of image I w.r.t. x at scale $\sigma$; Laplacian of the Gaussian $$\nabla^2 G(x;\sigma) = \lambda_{1,\sigma} + \lambda_{2,\sigma} + \lambda_{3,\sigma}; \qquad (4)$$

Gaussian curvature $$K(x;\sigma) = \lambda_{1,\sigma} \lambda_{2,\sigma} \lambda_{3,\sigma}; \qquad (5)$$

and the Frobenius norm of the Hessian $$\|H(x;\sigma)\|_F = \sqrt{\lambda_{1,\sigma}^2 + \lambda_{2,\sigma}^2 + \lambda_{3,\sigma}^2}. \qquad (6)$$

Normalized Convolution

The filtering is done by normalized convolution [10, 13] with a binary mask to exclude contribution from larger non-parenchyma structures, such as the trachea, the main bronchi, and the exterior of the lung. This approach was previously employed in pulmonary CT for the same purpose in [10]. The equation for normalized convolution is given by $$I_\sigma = \frac{(S(x)I(x)) * G(x;\sigma)}{S(x) * G(x;\sigma)} \qquad (7)$$

where * denotes convolution and segmentation S=s(I) computed from image I is used as an indicator function, marking whether x is a lung parenchyma voxel or not. Derivatives are computed on the Gaussian filtered images using finite differences.

Histogram Estimation

The filter responses are quantized into filter response histograms. The bin widths are derived using adaptive binning [19]. This technique locally adapts the histogram bin widths to the data set at hand such that each bin contains the same mass when computing the histogram of all data. Only voxels in the considered ROI that belongs to a lung segmentation S are used, and the resulting histogram is normalized to sum to one.

The number of histogram bins, $N_b$, computed from $N_s$ voxels, is determined by enforcing a proportional relationship between the standard deviation of the quantized filter response values, $\sigma_{width}$, and the standard deviation of the counts in each histogram bin, $\sigma_{height}$. By assuming a continuous uniform distribution across all $N_b$ bins, which is a reasonable assumption due to the adaptive binning principle, $$\sigma_{width} = \frac{N_b}{\sqrt{12}}$$

is obtained. Further, by assuming a Poisson distribution in each histogram bin with expected number of counts $$\frac{N_s}{N_b},$$

which is reasonable due to the uniform assumption across all bins, $$\sigma_{height} = \sqrt{\frac{N_s}{N_b}}$$

is obtained. Equating the two standard deviations gives rise to $$\sigma_{height} = \sqrt{\frac{N_s}{N_b}} = \frac{N_b}{\sqrt{12}} = \sigma_{width}.$$

Rearranging terms and requiring proportionality instead of equality leads to $$\sqrt{N_s} = \frac{N_b^{3/2}}{\sqrt{12}} \propto N_b^{3/2}$$

which can be rearranged into $$N_b \propto \sqrt[3]{\sqrt{N_s}}. \tag{8}$$

This is the estimate that shall be used.

Classification

Voxel classification is performed using the kNN classifier [6, 12] with summed histogram dissimilarity as distance $$D(x, y) = \sum_{i=1}^{N_f} L(f_i(x), f_i(y)), \tag{9}$$

where $N_f$ is the number of filter response histograms, $L(\cdot,\cdot)$ is a histogram dissimilarity measure, and $f_i(x) \in R^{N_b}$ is the i'th filter response histogram with $N_b$ bins estimated from a ROI centered on x.

Three histogram dissimilarity measures L are considered: L1-norm, L2-norm and the earth movers distance (EMD) [26]. The L1-norm and L2-norm are instances of the p-norm $$L_p(H, K) = \|H - K\|_p = \left(\sum_{i=1}^{N_b} |H_i - K_i|^p\right)^{1/p}, \tag{10}$$

with p=1 or p=2 and where $H, K \in R^{N_b}$ are histograms each with $N_b$ bins. The histograms used in this study are normalized to sum to one, and thus $L_1$ is equivalent to 1-histogramintersection [26]. EMD is equivalent to the Mallows distance when the histograms are one-dimensional and have equal mass [14], as in this study. In that case, EMD can be computed using (10) with p=1 on cumulative versions of H and K. This histogram dissimilarity measure will be denoted by $L_{EMD}$.

Posterior Probabilities

Two levels of posterior probabilities are considered in this study: voxel, or ROI, probabilities and subject probabilities. Note that subject and CT image is used interchangeably in this study and termed I. The voxel probability is based on the common k nearest neighbor posterior probability estimate [9]

$$P(\omega_i | x, I) = \frac{k_{\omega_i}(x)}{k}, x \in s(I) \tag{11}$$

where $k_{\omega_i}(x)$ is the number of nearest neighbors of voxel x, from lung segmentation s(I), belonging to class $\omega_i$ out of a total of k nearest neighbors according to (9). The voxel posterior probabilities are combined into an overall subject posterior probability using a static fusion scheme, namely, the mean rule [16]

$$P(\omega_i | I) = \frac{1}{N_r} \sum_{j=1}^{N_r} P(\omega_i | x_j, I) \tag{12}$$

where $N_r$ is the number of voxels that are considered. It is the subject posterior probability obtained using (12) that is proposed as a quantitative measure of COPD in this study.

Data

Low-dose volumetric CT images were acquired at full inspiration from current and former smokers enrolled in the Danish Lung Cancer Screening Trial (DLCST) [21] with the following scan parameters: tube voltage 120 kV, exposure 40 mAs, slice thickness 1 mm, and in-plane resolution ranging from 0.72 to 0.78 mm. The subjects were scanned at entry (baseline) and were then subsequently scanned annually (followup) for four consecutive years. Annual PFTs were also performed along with the CT images, including the forced expiratory volume in one second ($FEV_1$) and the forced vital capacity (FVC). Subjects were re-scanned after approximately three months in cases where non-calcified nodules of a certain size are detected.

Training and Parameter Selection

There are several parameters to select in the proposed classification system and these are listed below together with the possible parameter values considered:

ROI size r×r×r with r={21,31,41} voxels;
number of nearest neighbors in the kNN classifier k={25, 35,45};
histogram dissimilarity measure L={$L_1, L_2, L_{EMD}$};
the different base filters {(1), (2), (3), (4), (5), (6)} at scales $\sigma=\{0.6(\sqrt{2})^i\}_{i=0,\ldots,6}$ mm, as well as original intensity.

The best combination of r, L, and k is learned using cross-validation on the training set, T, and sequential forward feature selection (SFS) [12] is used for determining the optimal histogram subset for each combination. Together with the original intensity, a total of $N_f=57$ histograms are considered in the SFS. The CT images in the training set, $T=\{I_i\}$, are divided into a prototype set P and a validation set V by randomly placing half the images of each group in each set. The classification system is trained by using P as prototypes in the kNN classifier and by choosing the histograms and parameter settings that minimize the classification error on V, hence the criterion function in SFS is $$J(V) = \frac{1}{|V|} \sum_{I_j \in V} \sum_{x_j \in s(I_j)} \frac{1}{|s(I_j)|} C(x_i, I_j) \quad (13)$$

where s(I) is a lung segmentation obtained as described in Section 2.1 and $$C(x, I) = \delta\left(\underset{\omega_i}{\mathrm{argmax}}\, P(\omega_i \mid x, I) - \omega(x)\right) \in \{0, 1\}$$

is the hard classification output of the kNN classifier using (11), where $\delta(\cdot)$ denotes the Kronecker delta function and $\omega(x)$ is the true label of voxel x.

The number of ROIs sampled per subject, $N_r$, is fixed to 50, and the number of histogram bins, $N_b$, is determined as a function of the ROI size, r, using (8) with $N_s=r^3$. The adaptive histogram binning is computed from the training set using a separate randomly sampled set of ROIs, where 10 ROIs are sampled per subject in the training set. kNN classification is performed using the approximate nearest neighbor (ANN) library [1] with the approximation error set to zero to turn off the approximation part of the algorithm.

Evaluation

The performance of the classification system is estimated using 3-fold cross-validation. The system is trained in each fold as described above, and the test set is classified using the best performing kNN classifier, in terms of the validation error (13), with the complete training set, $T=P \cup V$, as prototypes. The results are evaluated by receiver operating characteristic (ROC) analysis, by means of the ROC curve and the area under the ROC curve (AUC), and by a Wilcoxon rank sum test for testing whether the quantitative measures can separate the two groups of subjects, healthy and COPD. All evaluations are performed on (12).

The obtained results are compared to the densitometric measures RA and PD. The densitometric measures are computed from the entire lung fields according to a lung segmentation s(I), which is the standard approach in the clinical literature [11, 18, 31]. The same lung segmentations are used in the method according to the invention and in the densitometric measures. RA corresponds to the amount of voxels below a given HU threshold relative to the total amount of voxels within the lung fields segmentation, where the used threshold is close to that of air, −1000 HU, [18]. This measure is sometimes referred to as emphysema index or density mask. PD is derived from the CT attenuation histogram as the density at which at least a certain percentage, also referred to as percentile, of voxels lies below the threshold density [11]. In this study, a HU threshold of −950 is used in RA, denoted $RA_{950}$ and the 15$^{th}$ percentile is used in PD, denoted $PD_{15}$. The proposed measure is denoted kNN in the experiments.

COPD Diagnosis

Table 1 shows group characteristics and lung function measurements for the two groups in the above COPD diagnosis procedure. The numbers reported are mean values, with standard deviation in parentheses and range in square brackets.

TABLE 1

|  | Healthy | COPD |
|---|---|---|
| Age (years) | 57 (5) [49-70] | 57 (5) [49-69] |
| Sex (men/women) | 105/39 | 32/120 |
| Height (cm) | 176 (8) [156-192] | 170 (8) [150-190] |
| Weight (kg) | 80 (13) [51-117] | 69 (13) [40-112] |
| Pack years | 33 (11) [10-88] | 40 (18) [20-133] |
| Smoking status (former/current) | 2*55/89 | 2*30/122 |
| $FEV_1$ (L) | 3.38 (0.64) [2.17-5.20] | 1.92 (0.42) [0.85-2.78] |
| $FEV_1$ % pred | 111 (18) [81-152] | 63 (11) [31-80] |
| $FEV_1/FVC$ | 0.76 (0.04) [0.70-0.87] | 0.60 (0.08) [0.37-0.70] |

The diagnosis of COPD is considered based on a two-class problem. Two subject groups are defined using the Global Initiative for Chronic Obstructive Lung Disease (GOLD) criteria [23] that are based on $FEV_1$ and FVC, as well as $FEV_1$ corrected for age, sex, and height ($FEV_1$% pred): a healthy group (no COPD; $FEV_1/FVC \geq 0.7$) and a COPD group (GOLD stage II or higher; $FEV_1/FVC<0.7$ and $FEV_1$% pred<80%). The labels are encoded as $\omega_i=\{0$ (healthy),1 (COPD)$\}$. The criteria are advantageously fulfilled both at baseline and at first year followup in order to decrease the influence of PFT noise on the labels. The number of subjects in the groups are 144 healthy and 152 COPD subjects, and the baseline CT images of these subjects from the DLCST database are used. The characteristics of the two groups are reported in Table 1. Each CT image is represented by $N_r$ ROIs that are randomly sampled within the lung fields, and these ROIs are labeled with the group label of the CT image from which they are sampled.

The results of the COPD diagnosis experiment are shown in FIG. 1 and in Table 2. The proposed texture-based approach, achieving an AUC of 0.817, is significantly better at discriminating between CT images from healthy subjects and COPD subjects than are the densitometric measures $PD_{15}$ and $RA_{950}$, $p<10^{-4}$. All three evaluated measures are capable of separating the two subject groups, p<0.05. Note that the densitometric measures are computed form the full lung fields, and they are therefore based on more information than are the proposed texture-based measure, which is computed from 50 randomly sampled ROIs. The performance of $PD_{15}$ and $RA_{950}$, when computed only on the same 50 ROIs as used in kNN, is slightly worse than when computed from the entire lung fields.

AUCs from the ROC analysis, p-values for difference in AUC with kNN according to a DeLong, DeLong, and Clarke-Pearson's test [7], and p-values for group separation according to a Wilcoxon rank sum test.

TABLE 2

Results of the COPD diagnosis experiment.

| Measure | AUC | p-value DeLong | p-value Wilcoxon |
|---|---|---|---|
| kNN | 0.817 | — | $<10^{-4}$ |
| $RA_{950}$ | 0.585 | 0 | 0.012 |
| $PD_{15}$ | 0.589 | $<10^{-4}$ | 0.008 |

Stability of Proposed Measure

Figure 2:
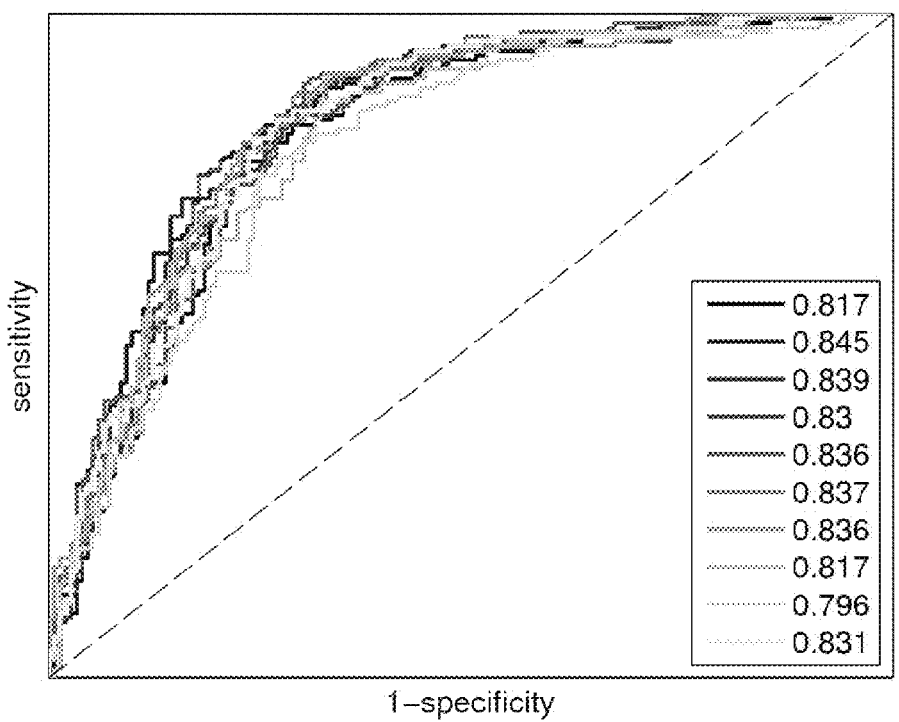
FIG. 2 shows ROC curves for ten repeated COPD diagnosis runs with different random ROI samplings on the same subject data splits. The legend shows the AUC of each run.

To investigate whether $N_r=50$, which was used in the conducted COPD diagnosis experiment, is a sufficient number of samples in order to capture the characteristics in the data related to healthy subjects and COPD subjects, the whole learning procedure was repeated ten times. Each time with the same training, prototype, validation, and test data splits, but with different randomly sampled ROIs. FIG. 2 shows the resulting ROC curves and the AUCs are reported in the legend in the figure. The standard deviation on the AUCs is 0.015. The AUCs are rather similar, and they are all larger than the AUCs of the densitometric measures. The selected parameters in the ten 3-fold cross-validations are reported in Table 3.

TABLE 3

Number of times a certain parameter is selected out of 30 possible (10 repeated 3-fold cross-validations) in the ten repeated COPD diagnosis experiments.

| k NN | | ROI size | | histogram dissimilarity | |
|---|---|---|---|---|---|
| k = 25 | 6 | r = 21 | 0 | L = $L_1$ | 24 |
| k = 35 | 8 | r = 31 | 0 | L = $L_2$ | 0 |
| k = 45 | 16 | r = 41 | 30 | L = EMD | 6 |

The tendency is large k in the kNN classifier, large ROI size r, and L1-norm as histogram dissimilarity measure.

Figure 3:
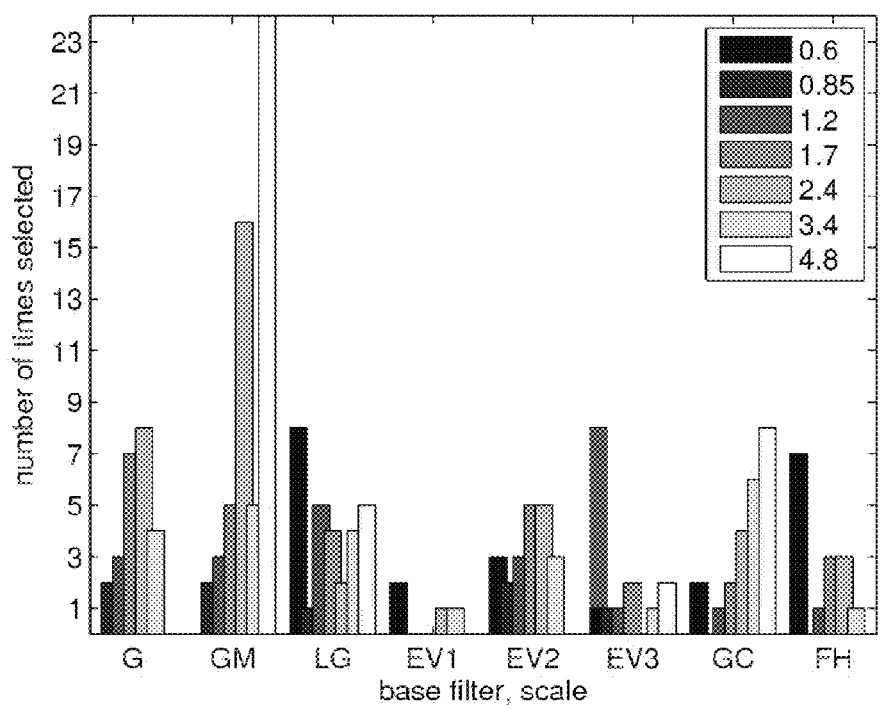
FIG. 3 shows the number of times a certain filter is selected out of 30 possible (10 repeated 3-fold cross-validations) in the ten repeated COPD diagnosis runs, grouped by base filter. Scales are ranging from black: 0.6 mm to white: 4.8 mm. The abbreviations are: Gaussian (G), gradient magnitude (GM), Laplacian of the Gaussian (LG), first, second, and third eigen value of the Hessian Matrix (EV1), (EV2), and (EV3), Gaussian curvature (GC), and Frobenius norm of the Hessian (FH)

FIG. 3 reports the number of times individual filters are selected and Table 4 reports the most commonly occurring filter subsets of sizes two and three.

TABLE 4

Filter subsets of sizes two and three that were most often selected in the SFS.

| filter subset | occurrences |
|---|---|
| $\{\|\nabla G(x; 2.4)\|_2, \|\nabla G(x; 4.8)\|_2\}$ | 13 |
| $\{\nabla^2 G(x; 0.6), \|\nabla G(x; 4.8)\|_2\}$ | 8 |
| $\{G(x; 2.4), \|\nabla G(x; 4.8)\|_2\}$ | 7 |
| $\{\lambda_{3, 0.6}, \|\nabla G(x; 4.8)\|_2\}$ | 7 |
| $\{K(x; 4.8), \|\nabla G(x; 4.8)\|_2\}$ | 7 |
| $\{\nabla^2 G(x; 0.6), \|\nabla G(x; 2.4)\|_2\}$ | 6 |
| $\{\|H(x; 0.6)\|_F, \|\nabla G(x; 4.8)\|_2\}$ | 6 |
| $\{\nabla^2 G(x; 0.6), \|\nabla G(x; 2.4)\|_2, \|\nabla G(x; 4.8)\|_2\}$ | 2*6 |

The gradient magnitude, $\|\nabla G(x;\sigma)\|_2$, is by far the most often selected base-filter. The filter is selected 24 times at $\sigma=4.8$ mm and 16 times at $\sigma=2.4$ mm, out of 30 possible times. Further, the filter is member of all the most commonly selected subsets of sizes two and three, sometimes at multiple scales. The remaining base-filters are selected at least five times at a certain scale, except for the absolute largest eigenvalue of the Hessian matrix, $\lambda_{1,\sigma}$, which is rarely selected. A frequently occurring subset is the Laplacian of the Gaussian at a small scale together with the gradient magnitude at a large scale, see Table 4. The tendency is that the size of the filter, or histogram, subset selected in SFS is 3-6 histograms out the 57 possible histograms.

3.6 Reproducibility and Robustness to Inspiration Level

The reproducibility of the proposed measure as well as the robustness to inspiration level is evaluated and compared to the densitometric measures on a set of 50 CT image pairs from the DLCST database. Both images in a pair are from the same subject that has been re-scanned for a suspicious nodule and there is therefore a short time between the two scans. All pairs have less than 86 days between the acquisition dates, and the disease is not expected to progress far enough to induce visible differences in CT within this time interval. There is no overlap between the 50 CT image pairs used here and the baseline CT images in the two subject groups from the COPD diagnosis procedure described above. The trained kNN classifiers from the three folds in the diagnosis procedure described above are used to represent the proposed measure.

The coefficient of repeatability (CR) [4] is used to evaluate the reproducibility of the different measures on the CT image pairs, and it is computed as $$CR = 1.96 \sqrt{1/50 \sum_i^{50} (m(I_i^{(1)}) - m(I_i^{(2)}))^2},$$

where $m(\cdot)$ is the measure used, and $(I^{(1)}, I^{(2)})$ is a CT image pair. The measurements are scaled linearly to the interval $[-1,1]$ for comparability, since they use different units, e.g., $PD_{15}$ uses HU whereas the proposed measure, (12), is a posterior probability. CR is computed both for all pairs and for half the pairs with the smallest lung volume (LV) difference and for half the pairs with the largest LV difference. The results are reported in Table 5.

TABLE 5

Coefficients of repeatability.

| Measure | All pairs | Small LV diff. | Large diff. LV |
|---|---|---|---|
| kNN, fold 1 | 0.58 | 0.62 | 0.53 |
| kNN, fold 2 | 0.81 | 0.89 | 0.71 |
| kNN, fold 3 | 0.91 | 0.84 | 0.98 |
| $RA_{950}$ | 0.70 | 0.47 | 0.88 |
| $PD_{15}$ | 0.89 | 0.69 | 1.06 | kNN is more reproducible than $RA_{950}$ and $PD_{15}$ in fold 1, and is comparable or less reproducible in the two other folds, when seen across all 50 pairs. The densitometric measures are sensitive to difference in LV between two images. For $RA_{950}$, the difference in CR, when computed on the group with small LV difference and the group with large LV difference, is 0.88−0.47=0.41, and for $PD_{15}$ the difference is 39. For kNN, the difference is much smaller, indicating less sensitivity to difference in LV.

The main source of variability between two CT images from the same subject, with a short time interval between acquisition dates, is expected to be the inspiration level. Although, other sources, such as scanner drift and different subject orientations during scanning also play a role. Since LV is an indicator of inspiration level, the results in the two right-most columns in Table 5 indicate that kNN is more robust to inspiration level—the main source of variability in CT, as compared to the densitometric measures. This is further evaluated by correlating signed measurement difference with relative signed LV difference, computed as the difference divided by the average. The correlation coefficients are as follows: $r_{RA_{950}}=-0.81$ ($p \leq 10^{-4}$), $r_{PD_{950}}=0.83$ ($p \leq 10^{-4}$), $r_{kNN}=\{0.25 \text{ } (p=0.09), -0.13 \text{ } (p=0.36), 0.47 \text{ } (p \leq 10^{-4})\}$. Differences in both the densitometric measures are significantly correlated with LV difference whereas differences in two out of three kNN based measures are not. The proposed measure is therefore, for certain trained kNN classifiers, less sensitive to inspiration level than are the densitometric measures.

Discussion and Conclusion

The proposed fully automatic, data-driven texture-based measure achieves an AUC of 0.817 on the COPD diagnosis problem, see Table 2. This is significantly better ($p<10^{-4}$) than the two densitometric approaches $RA_{950}$ and $PD_{15}$, achieving AUCs of 0.585 and 0.589, respectively. The proposed approach relies on $N_r$ randomly sampled ROIs from each lung fields segmentation, and in the conducted COPD diagnosis experiment, $N_r=50$ was used. The stability determination reported above showed that this is a sufficient number of samples in order to train a texture-based classifier on the COPD diagnosis problem. However, the AUC standard deviation of 0.015 may possibly be further decreased by increasing $N_r$ at the expense of increased execution time, mainly due to more prototypes in the kNN classifier. The proposed measure is generally more reproducible than, or comparable to, the densitometric measures, see Table 5. This is, however, dependent on which of the trained kNN classifiers that are used from the 3-fold cross-validation procedure. The proposed measure is less sensitive to inspiration level, both shown by the results in Table 5 and by the non-significant correlations between measurement difference and LV difference. Interestingly, the densitometric measures are more reproducible compared to the proposed measure when the difference in LV is small, see Table 5. This difference may be explained by the semi-local properties of the used texture descriptor. Changing the intensity in a few voxels in an ROI results in a small change in the densitometric measures whereas the ROI may suddenly shift to a different part of the feature space of the texture descriptor, resulting in considerably different posterior probabilities estimated in the surrounding voxels by the kNN classifier.

The above example shows that it is possible to train a texture-based classifier for quantification of COPD in pulmonary CT images using supervised learning techniques in a fully automatic, data-driven approach without any human intervention. Hereby, all the limitations associated with manual labeling, including subjectivity, are completely avoided. The meta-data driven labeling of CT image ROIs, in this example using PFT data, might have been expected to suffer from other potential problems, however. Pathology may be localized in COPD subjects, and emphysema is not always uniformly distributed within the lungs. Paraseptal emphysema is located in the periphery of the lung, centrilobular emphysema is predominantly in the upper lobes, while panlobular emphysema is predominantly in the lower lobes [31], for example. Randomly sampled ROIs from COPD subjects will therefore contain both pathological and healthy tissue where the healthy tissue ROIs are erroneously labeled as COPD. The reverse may also be the case in healthy subjects but is expected to be less prominent. The classes in this weakly labeled data set are therefore expected to overlap more compared to classes in a manually labeled data set where experts have annotated relatively ideal examples of the different classes, and this poses a challenging classification problem. However, considering the vast amount of medical imaging data currently produced in routine clinical practice and screening studies, this is no problem since more and more data is available for training. Further, since the proposed approach is fully data-driven, the large amounts of data can be used without an initial manual annotation step.

Intensity can be directly related to emphysema in CT since emphysematous regions have lower intensity than do healthy regions due to loss of lung tissue. Original and smoothed intensities, $G(x;\sigma)$, may, therefore, be considered as important features when discriminating between lung tissue in healthy subjects and in COPD subjects. This is also supported by the results of the stability determination above where $G(x;\sigma)$ is selected 18 out of 30 possible times in the SFS procedure. However, the original intensity, which is what RA and PD rely on, is never selected. Some filters capturing structural information are also selected often, $\|\nabla G(x;\sigma)\|_2$ is selected 27 times, $\nabla^2 G(x;\sigma)$ is selected 21 times, and $K(x;\sigma)$ is selected 19 times. Consequently, the resulting classifiers use smoothed intensity information in conjunction with textural information, which makes the proposed measure for COPD very different from the standard densitometric measures RA and PD. The use of information at larger scales, and the use of texture information may explain the improved performance compared to RA and PD.

The general tendency for the filters capturing structural information that are selected in the SFS procedure is large scale edges, $\|G(x;4.8)\|_2$ and/or $\|G(x;2.4)\|_2$, in conjunction with small scale blobs $\nabla^2 G(x;0.6)$ or large scale blobs $K(x;4.8)$, see Table 4. These results share both similarities and dissimilarities with a previous study using a similar classification setup with a similar filter bank on a different data set, but with the important difference that manually annotated ROIs were used [28]. $\|G(x;\sigma)\|_2$ at a large scale is almost always selected, both in the present study and in [28]. On the contrary, $G(x;\sigma)$ at a small scale, i.e., intensity information, is also frequently selected in [28] whereas it is less frequently selected in the present study. This may be explained by the weak labeling of data causing a large class overlap.

The gender distribution in the two groups in the COPD diagnosis experiment is skewed, see Table 1. There are 105 males and 39 females in the healthy group as opposed to 32 males and 120 females in the COPD group. The ROC-analysis has therefore been repeated for each gender separately to inspect whether the gender skewness has influenced the results. For males, the following AUCs are obtained: 0.892, 0.770, and 0.781, for kNN, $RA_{950}$, and $PD_{15}$, respectively, and for females the AUCs are: 0.810, 0.641, and 0.636. In both cases, the AUC of kNN is higher compared to the densitometric measures, and it is significantly higher in all but one case. For males, the kNN AUC is not significantly larger than the $RA_{15}$ AUC, $p=0.06$.

This study considered diagnosis of COPD based on a two-class problem defined by the two subject groups, healthy (no COPD according to the GOLD criteria [23]), and COPD (GOLD stage II or higher according to the GOLD criteria [23]). These criteria use $FEV_1$ and FVC, and thus the groupings were defined solely using PFTs. However, many other possibilities exist, both on the type of problem to consider and on the type of meta-data to use for group definitions. One possibility would be to aim at differential diagnosis by considering a multi-class problem with different types of emphysema groups, e.g. smoking related emphysema and $\alpha_1$-antitrypsin deficiency related emphysema, as well as a healthy group. Another possibility is to consider several or all of the four GOLD stages [23] as separate groups. This is similar in spirit to [17]. Other meta-data, such as blood samples, demographic data, health status, smoking history, smoking status, or genetic data, could also be utilized in defining groups, either in isolation or in combination.

Classifiers were trained at the ROI level without including knowledge about the subsequent fusion of the voxel posterior probabilities using (12). The rationale is to capture the local texture information and use this for quantification. However, though the proposed approach works well as illustrated in the results, an alternative approach would be CT image level learning, e.g. by adapting the objective function for SFS to use (12) instead of (11).

COPD comprises two main components, small airway disease and emphysema. The proposed measure mainly targets emphysema, but small airway disease is also targeted to some extent since the lung segmentation algorithm used includes the interior of the small airways and since the labels are obtained from PFTs, which are affected by both components. The airway information could be targeted more explicitly, e.g. by combining the output of the proposed approach with measurements computed directly on the segmented airway tree.

Whilst the invention has been described above in terms of diagnosing the presence of existing disease, it may also be applied to the task of determining from an apparently healthy looking image whether the patient is at increased risk of future disease. Thus, for training a model, two patient groups, 'stable' and 'declining' may be defined based upon difference in lung function found in a longitudinal study, e.g. at baseline (FEV1% pred_baseline) and at 3 year followup (FEV1% pred_3 year_followup). The lung function difference is:

$$d\_i = \text{FEV1\%pred\_3year\_followup}\_i - \text{FEV1\%pred\_baseline}\_i$$

The tails in the distribution of d_i are used. In an example, there are 244 subjects in each group. The stable group also contains subjects with $d\_i > 0$. The whole learning framework is then run on the baseline CT images of the subjects in the two groups, and when the classifier is applied to an apparently healthy image of a patient's lungs, the output is a probability of future decline in lung function.

Figure 4:
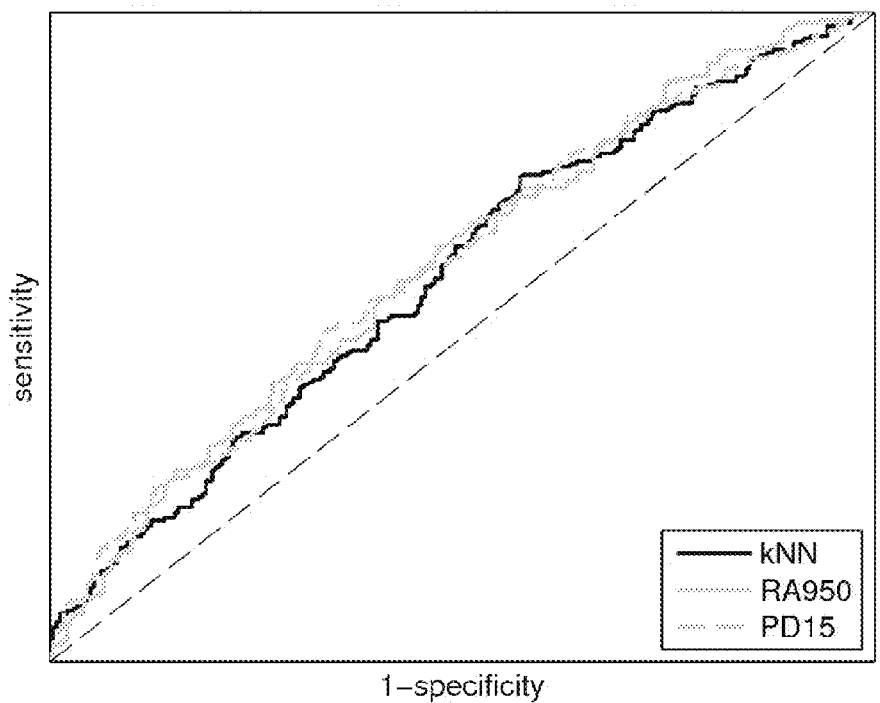
FIG. 4 shows ROC curves obtained in a demonstration of the method of the invention applied as a prognostic indicator in COPD development.

Results of such a procedure can be seen in FIG. 4. kNN is the proposed measure. In FIG. 4, the AUC of kNN is 0.595 and for the two common computerized quantitative measures, it is: RA950 0.612, PD15 0.610.

In this specification, unless expressly otherwise indicated, the word 'or' is used in the sense of an operator that returns a true value when either or both of the stated conditions is met, as opposed to the operator 'exclusive or' which requires that only one of the conditions is met. The word 'comprising' is used in the sense of 'including' rather than in to mean 'consisting of'. All prior teachings acknowledged above are hereby incorporated by reference. No acknowledgement of any prior published document herein should be taken to be an admission or representation that the teaching thereof was common general knowledge in Australia or elsewhere at the date hereof.

REFERENCES

[1] Sunil Arya and David M. Mount and Nathan S. Netanyahu and Ruth Silverman and Angela Y. Wu. An Optimal Algorithm for Approximate Nearest Neighbor Searching in Fixed Dimensions. *J. ACM*, 45(6):891-923, 1998.

[2] Yulia Arzhaeva and Laurens Hogeweg and Pim A. de Jong and Max A. Viergever and Bram van Ginneken. Global and Local Multi-valued Dissimilarity-Based Classification: application to Computer-Aided Detection of Tuberculosis. *MICCAI* (1), pages 724-731, 2009.

[3] A. A. Bankier and V. De Maertelaer and C. Keyzer and P. A. Gevenois. Pulmonary emphysema: subjective visual grading versus objective quantification with macroscopic morphometry and thin-section CT densitometry. *Radiology*, 211(3):851-858, 1999.

[4] J. M. Bland and D. G. Altman. Statistical methods for assessing agreement between two methods of clinical measurement. *Lancet*, 1(8476):307-310, 1986.

[5] Francois Chabat and Guang-Zhong Yang and David M Hansell. Obstructive lung diseases: texture classification for differentiation at CT. *Radiology*, 228(3):871-877, 2003.

[6] Cover, T. and Hart, P. Nearest neighbor pattern classification. *IEEE_J_IT*, 13(1):21-27, 1967.

[7] E. R. DeLong and D. M. DeLong and D. L. Clarke-Pearson. Comparing the areas under two or more correlated receiver operating characteristic curves: a nonparametric approach. *Biometrics*, 44(3):837-845, 1988.

[8] A. Dirksen and N. H. Holstein-Rathlou and F. Madsen and L. T. Skovgaard and C. S. Ulrik and T. Heckscher and A. Kok-Jensen. Long-range correlations of serial FEV1 measurements in emphysematous patients and normal subjects. *J Appl Physiol*, 85(1):259-265, 1998.

[9] Duda, Richard O. and Hart, Peter E. and Stork, David G. *Pattern Classification (2nd Edition)*. Wiley-Interscience, 2000.

[10] Ola Friman and Magnus Borga and Mikael Lundberg and Ulf Tylén and Hans Knutsson. Recognizing Emphysema—A Neural Network Approach. *ICPR '02: Proceedings of the 16 th International Conference on Pattern Recognition (ICPR '02) Volume* 1, pages 10512, Washington, D.C., USA, 2002. IEEE Computer Society.

[11] G. A. Gould and W. MacNee and A. McLean and P. M. Warren and A. Redpath and J. J. Best and D. Lamb and D. C. Flenley. CT measurements of lung density in life can quantitate distal airspace enlargement—an essential defining feature of human emphysema. *Am Rev Respir Dis*, 137(2):380-392, 1988.

[12] Jain, A. K. and Duin, R. P. W. and Jianchang Mao. Statistical pattern recognition: a review. *IEEE_J_PAMI*, 22(1):4-37, 2000.

[13] H. Knutsson and C.-F. Westin. Normalized and Differential Convolution: Methods for Interpolation and Filtering of Incomplete and Uncertain data. *Proceedings of Computer Vision and Pattern Recognition* ('93), pages 515-523, New York City, USA, 1993.

[14] Levina, E. and Bickel, P. The Earth Mover's distance is the Mallows distance: some insights from statistics. *Proc. Eighth IEEE International Conference on Computer Vision ICCV* 2001, pages 251-256, 2001.

[15] Pechin Lo and Jon Sporring and Haseem Ashraf and Jesper J. H. Pedersen and i de Bruijne. Vessel-guided Airway Tree Segmentation: A Voxel Classification Approach. *Med. Image Anal.*, In Press, Accepted Manuscript:-, 2010.

[16] Loog, Marco and Van Ginneken, B. Static posterior probability fusion for signal detection: applications in the detection of interstitial diseases in chest radiographs. *ICPR* (1), pages 644-647, 2004.

[17] K. Murphy and B. van Ginneken and E. M van Rikxoort and B. J. de Hoop and M. Prokop and P. Lo and M. de Bruijne and J. P. W. Pluim. Obstructive pulmonary function: patient classification using 3D registration of inspiration and expiration CT images. *The Second International Workshop on Pulmonary Image Analysis*, 2009.

[18] N. L. Müller and C. A. Staples and R. R. Miller and R. T. Abboud. "Density mask". An objective method to quantitate emphysema using computed tomography. *Chest*, 94(4):782-787, 1988.

[19] Timo Ojala and Matti Pietikäinen and David Harwood. A comparative study of texture measures with classification based on featured distributions. *Pattern Recognition*, 29(1):51-59, 1996.

[20] Yang Shin Park and Joon Beom Seo and Namkug Kim and Eun Jin Chae and Yeon Mok Oh and Sang Do Lee and Youngjoo Lee and Suk-Ho Kang. Texture-based quantifi-

[20] cation of pulmonary emphysema on high-resolution computed tomography: comparison with density-based quantification and correlation with pulmonary function test. *Investigative Radiology*, 43(6):395-402, 2008.

[21] Jesper H Pedersen and Haseem Ashraf and Asger Dirksen and Karen Bach and Hanne Hansen and Phillip Toennesen and Hanne Thorsen and John Brodersen and Birgit Guldhammer Skov and Martin Døssing and Jann Mortensen and Klaus Richter and Paul Clementsen and Niels Seersholm. The Danish randomized lung cancer CT screening trial—overall design and results of the prevalence round. *J Thorac Oncol*, 4(5):608-614, 2009.

[22] Mithun Prasad and Arcot Sowmya and Peter Wilson. Multi-level classification of emphysema in HRCT lung images. *Pattern Anal. Appl.*, 12(1):9-20, 2009.

[23] Klaus F. Rabe and Suzanne Hurd and Antonio Anzueto and Peter J. Barnes and Sonia A. Buist and Peter Calverley and Yoshinosuke Fukuchi and Christine Jenkins and Roberto Rodriguez-Roisin and Chris van Weel and Jan Zielinski. Global strategy for the diagnosis, management, and prevention of chronic obstructive pulmonary disease: GOLD executive summary. *Am J Respir Crit Care Med*, 176(6):532-555, 2007.

[24] Raundahl, J. and Loog, M. and Pettersen, P. and Tanko, L. B. and Nielsen, M. Automated Effect-Specific Mammographic Pattern Measures. *IEEE_J_MI*, 27(8):1054-1060, 2008.

[25] Bart M. ter Haar Romeny. *Gaussian Scale-Space Theory*, chapter Applications of scale-space theory, pages 3-19. Dordrecht: Kluwer Academic Publishers, 1997.

[26] Yossi Rubner and Carlo Tomasi and Leonidas J. Guibas. The Earth Mover's Distance as a Metric for Image Retrieval. *Int. J. Comput. Vision*, 40(2):99-121, 2000.

[27] Ingrid C Sluimer and Paul F van Waes and Max A Viergever and Bram van Ginneken. Computer-aided diagnosis in high resolution CT of the lungs. *Med. Phys.*, 30(12):3081-3090, 2003.

[28] Sørensen, L. and Shaker, S. B. and de Bruijne, M. Quantitative Analysis of Pulmonary Emphysema Using Local Binary Patterns. *IEEE_J_MI*, 29(2):559-569, 2010.

[29] Lauge Sørensen and Pechin Lo and Haseem Ashraf and Jon Sporring and Mads Nielsen and Marleen de Bruijne. Learning COPD Sensitive Filters in Pulmonary CT. *MICCAI* (1), pages 699-706, 2009.

[30] R. Uppaluri and E. A. Hoffman and M. Sonka and P. G. Hartley and G. W. Hunninghake and G. McLennan. Computer recognition of regional lung disease patterns. *Am. J. Respir. Crit. Care Med.*, 160(2):648-654, 1999.

[31] Webb, W. R. and Müller, N. L. and Naidich, D. P. *High-Resolution CT of the Lung, Third Edition*. Lippincott Williams & Wilkins, 2001.

[32] Ye Xu and Milan Sonka and Geoffrey McLennan and Junfeng Guo and Eric A Hoffman. MDCT-based 3-D texture classification of emphysema and early smoking related lung pathologies. *IEEE_J_MI*, 25(4):464-475, 2006.

[33] Turner, M. R. Texture Discrimination by Gabor Functions. *Biological Cybernetics*, 55:71-82, 1986

[34] T. Leung and J. Malik. Representing and recognizing the visual appearance of materials using three-dimensional textons. *International Journal of Computer Vision*, 43(1):29-44, 2001.

[35] Haralick, R. M. Statistical and structural approaches to texture. *Proceedings of the IEEE*, 67(5): 786-804, 1979.

[36] Ojala, T. and Pietikainen, M. and Maenpaa, T. Multiresolution Gray-Scale and Rotation Invariant Texture Classification with Local Binary Patterns. *IEEE Trans Pattern Anal Mach Intell*, 24(7):971-987, 2002.

[37] Leo Breiman. Random forests. *Machine Learning*, 45(1):5-32, 2001.

[38] E. Pekalska and R. P. W. Duin. Dissimilarity representations allow for building good classifiers. *Pattern Recog. Lett.*, 23(8):943-956, 2002.

[39] Carl Edward Rasmussen and Christopher K. I. Williams. *Gaussian Processes for Machine Learning*. The MIT Press, 2006.

[40] P. Quanjer, G. Tammeling, J. Cotes, O. Pedersen, R. Peslin, and J. Yernault, "Lung volumes and forced ventilatory flows. Report working party standardization of lung function tests, European Community for Steel and Coal. Official statement of the European Respiratory Society," *Eur Respir J Suppl*, vol. 16, pp. 5-40, 1993.

INCORPORATION BY REFERENCE

The contents of all references (including literature references, issued patents, published patent applications, and co-pending patent applications) cited throughout this application are hereby expressly incorporated herein in their entireties by reference.

EQUIVALENTS

Those skilled in the art will recognize, or be able to ascertain using no more than routine experimentation, many equivalents of the specific embodiments of the invention described herein. Such equivalents are intended to be encompassed by the following claims.

The invention claimed is:

1. A method for the computerised classification of a digital medical diagnostic image of a lung or a part thereof, comprising applying to said image a trained statistical classifier which has been trained by supervised learning on a training set of methodologically similar lung images each of which images has been labelled by metadata being data which is not obtained from the image or images and which is indicative of the likelihood of the respective image relating to a lung characterised by a lung disease, or the degree of such disease, or propensity to develop such disease, wherein in said training of the classifier, for each image in the training set a number of regions of interest (ROIs) were defined, and textural information relating to the intensities of locations within each ROI was obtained, and combinations of features of said textural information were found which suitably classify said training set images according to said metadata, and wherein, in applying said trained statistical classifier to said image, in a computer a number of regions of interest (ROIs) are defined in said image, and textural information relating to the intensities of locations within each ROI of the kind used in training the classifier is obtained, and features of said textural information for the locations within the ROIs of the image are combined as learnt in the training of the classifier to calculate probabilities of said locations within the ROIs belonging to a healthy lung as against a lung characterised by a said disease or degree of disease or propensity to develop such disease and said probabilities are combined to obtain for the image a quantitative fused probability of the image belonging to a healthy lung as against a lung characterised by said disease, or a degree thereof, or a propensity to develop said disease.

2. A method as claimed in claim 1, wherein each image is a computed tomography (CT) image.

3. A method as claimed in claim 1, wherein each image is a radiograph image or is an MRI image.

4. A method as claimed in claim 1, wherein said disease is a non-focal lung disease.

5. A method as claimed in claim 1, wherein said disease is chronic obstructive pulmonary disease (COPD).

6. A method as claimed in claim 1, wherein said disease is a diffuse parenchymal lung disease, or a small airways disease.

7. A method as claimed in claim 1, wherein said disease is cystic fibrosis, idiopathic pulmonary fibrosis, or severe asthma.

8. A method as claimed in claim 1, wherein each said image is a 3D image and said locations within ROI's are voxels.

9. A method as claimed in claim 1, wherein each said image is a 3D image and said locations within ROI's are pixels within a 2D slice of said image.

10. A method as claimed in claim 1, wherein the trained classifier is a kNN classifier.

11. A method as claimed in claim 1, wherein in training said classifier and in applying said classifier to said image to be classified said features of textural information are obtained by applying a bank of Gaussian filters and obtaining histograms of responses to said filters.

12. A method as claimed in claim 11, wherein said filters are rotational invariant filters.

13. A method as claimed in claim 12, wherein said filters comprise one or more of the following:

(a) The Gaussian function $$G(x;\sigma) = \frac{1}{(2\pi^{1/2}\sigma)}\exp\left(-\frac{\|x\|_2^2}{2\sigma}\right)$$

where $\sigma$ is the standard deviation, or scale;

(b), (c), (d) the three eigenvalues of the Hessian matrix $$\lambda_{i,\sigma}, i=1,2,3, |\lambda_{1,\sigma}| \geq |\lambda_{2,\sigma}| \geq |\lambda_{3,\sigma}|$$

(e) gradient magnitude $$\|\nabla G(x;\sigma)\|_2 = \sqrt{I_{x,\sigma}^2 + I_{y,\sigma}^2 + I_{z,\sigma}^2},$$

where $I_{x,\sigma}$ denotes the partial first order derivative of image I w.r.t. x at scale $\sigma$;

(f) Laplacian of the Gaussian $$\nabla^2 G(x;\sigma) = \lambda_{1,\sigma} + \lambda_{2,\sigma} + \lambda_{3,\sigma};$$

(g) Gaussian curvature $$K(x;\sigma) = \lambda_{1,\sigma}\lambda_{2,\sigma}\lambda_{3,\sigma};$$

and (h) the Frobenius norm of the Hessian $$\|H(x;\sigma)\|_F = \sqrt{\lambda_{1,\sigma}^2 + \lambda_{2,\sigma}^2 + \lambda_{3,\sigma}^2}.$$

14. A method for the computerised classification of a digital medical diagnostic image of a lung or a part thereof, comprising applying to said image a trained statistical classifier which has been trained by supervised learning on a training set of methodologically similar lung images each of which images has been labelled by metadata being data which is not obtained from the image or images and which is indicative of the likelihood of the respective image relating to a lung characterised by a lung disease, or the degree of such disease, or propensity to develop such disease, wherein in said training of the classifier, for each image in the training set a number of regions of interest (ROIs) were defined, and textural information relating to the intensities of locations within each ROI was obtained, and combinations of features of said textural information were found which suitably classify said training set images according to said metadata, and wherein, in applying said trained statistical classifier to said image, in a computer a number of regions of interest (ROIs) are defined in said image, and textural information relating to the intensities of locations within each ROI of the kind used in training the classifier is obtained, and features of said textural information for the locations within the ROIs of the image are combined as learnt in the training of the classifier to calculate probabilities of said locations within the ROIs belonging to a healthy lung as against a lung characterised by a said disease or degree of disease or propensity to develop such disease and said probabilities are combined to obtain for the image a quantitative fused probability of the image belonging to a healthy lung as against a lung characterised by said disease, or a degree thereof, or a propensity to develop said disease, wherein in training said classifier and in applying said classifier to said image to be classified said ROIs are scattered within the image and together comprise not more than 60% of the image.

15. A method as claimed in claim 14, wherein the said ROI's are randomly sampled within the image.

16. A method for the development of a statistical classifier for computerised classification of a medical diagnostic image of a lung or a part thereof, comprising in a suitably programmed computer taking a training set of methodologically similar lung images each of which images has been labelled by metadata being data which is not obtained from the image or images and which is indicative of the likelihood of the respective image relating to a lung characterised by a lung disease, or the degree of such disease, or propensity to develop such disease, and training the classifier by, for each image in the training set defining a number of regions of interest (ROIs), and obtaining textural information relating to the intensities of locations within each ROI, and finding combinations of features of said textural information which suitably classify said training set images according to said metadata.

* * * * *